(No Model.)
C. F. BAKER.
OIL FILTER.
No. 392,092. Patented Oct. 30, 1888.
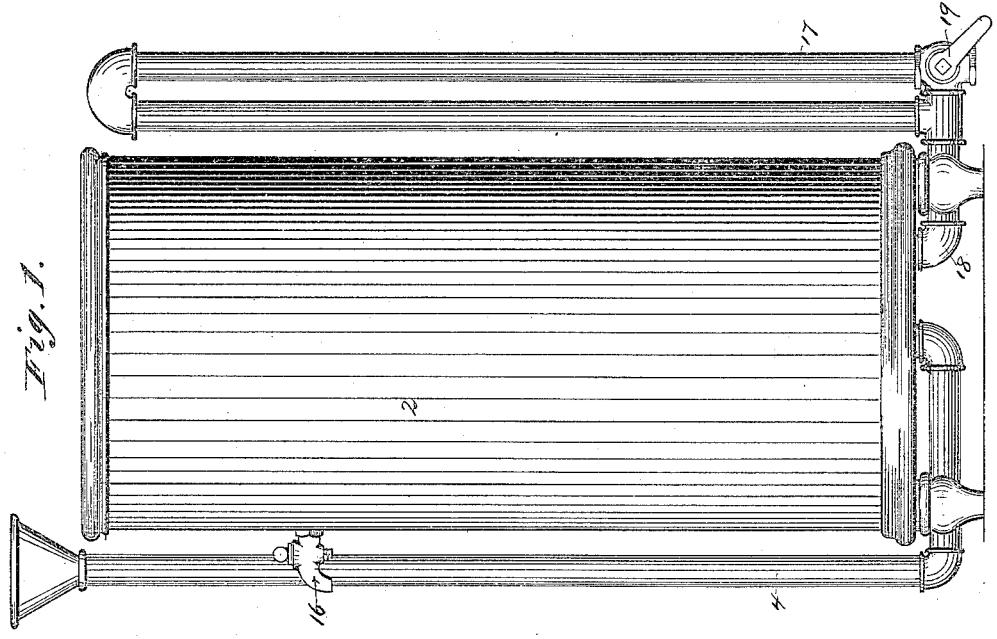
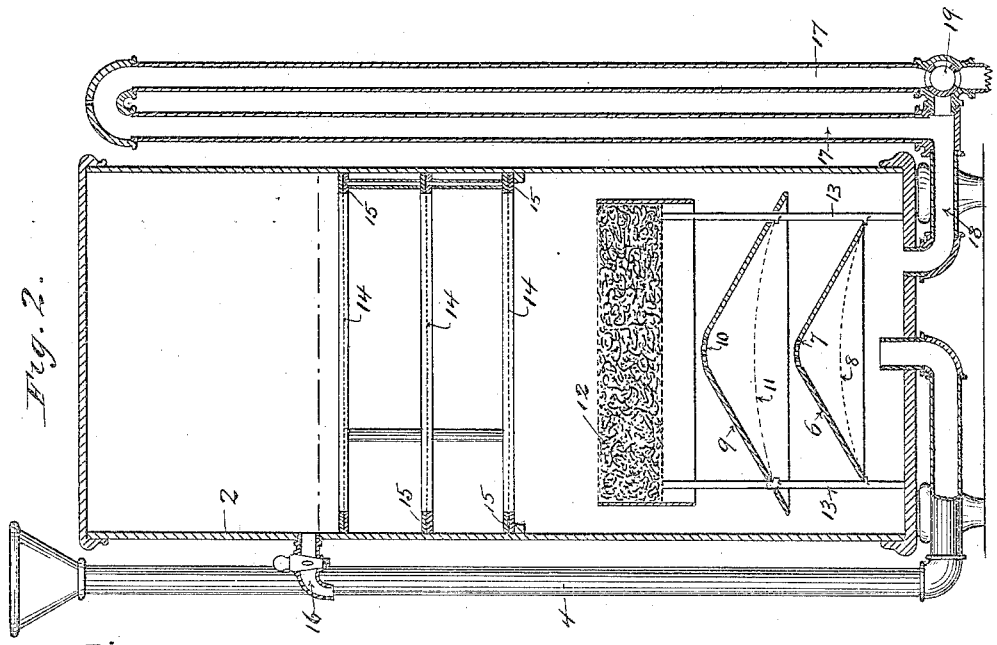
Witnesses:
R. H. Sanford
A. M. Gaskell
Inventor:
Charles F. Baker,
By A. C. Paul,
Atty.

UNITED STATES PATENT OFFICE.

CHARLES F. BAKER, OF MINNEAPOLIS, MINNESOTA.

OIL-FILTER.

SPECIFICATION forming part of Letters Patent No. 392,092, dated October 30, 1888.

Application filed August 24, 1886. Serial No. 211,707. (No model.)

*To all whom it may concern:*

Be it known that I, CHARLES F. BAKER, of Minneapolis, in the county of Hennepin and State of Minnesota, have invented certain new and useful Improvements in Oil Filters, of which the following is a specification.

My invention relates to an improvement in oil-filters; and it consists, generally, in the construction and combination hereinafter described, and particularly pointed out in the claims.

In the drawings which form a part of this specification, Figure 1 is a side elevation of my improved filter, and Fig. 2 is a vertical section of the same.

2 represents the outer case of the filter, which is preferably made of cylindrical form and may be formed of glass or have a glass plate inserted upon one side for the purpose of indicating the quantity of oil contained in the filter or to allow the whole operation to be visible.

4 is an inlet or stand pipe for the purpose of receiving and conducting the oil to the filter. Its lower end is connected to and opens into the filter-case, preferably at or near the center of the bottom plate.

6 is a cone-shaped plate placed over the inlet-opening. This cone has openings 7 at its apex, and I prefer to place a wire-gauze, 8, upon its under side, fastened at or near its lower extremity and extending over its entire surface.

9 is another cone-shaped plate placed a short distance above the cone 6. It may be the exact counterpart of the one below, except that it is preferably somewhat larger in diameter. It is provided with openings 10 and wire-gauze, 11. This gauze may be of finer mesh than the one below, if desired.

12 is a filter-box, which may be of circular shape somewhat smaller in diameter than the interior of the filter-case. The top and bottom of this filter-box are constructed of perforated metal or wire-gauze, and the sides extend, preferably, a short distance below the bottom, forming a cup-shaped receptacle for the oil. The interior of this filter-box may be filled with charcoal, sand, wool, or other suitable filtering material.

The two cone-shaped plates and filter-box may be secured to and supported by suitable standards, 13. These standards are preferably fastened to the bottom of the filter-case, and the plates and filter-box are preferably secured to them. I propose to use this filter-box only for certain grades of oil. For ordinary use the oil will be sufficiently cleansed without it.

14 are filter-cloths held in suitable frames, 15, which are fitted closely to the interior of the case. There may be two or more of these filter-cloths, as the quality of the oil may demand.

16 is a faucet located in the oil-space or top portion of the filter for the purpose of drawing off the cleansed oil.

17 is an inverted-U-shaped pipe connected with the bottom portion or water-space of the filter by means of the pipe 13. At the inner juncture the connection between these two pipes is made with an open T; but at the outer juncture a three-way cock, 19, is located. This three-way cock closes the opening in the pipe 18 and allows a continuous overflow through the pipe 17 of the superfluous liquor, or it may be used to open the pipe 18 and draw off the entire contents of the filter.

The operation of my filter is as follows: The filter-cloths 14, cones 6 and 9, and the filter-box 12 are all placed in their proper positions, and the filter is then filled with water or with a chemical solution having about the same specific gravity until the upper filter-cloth is submerged, the liquid being carried to about the position denoted by the dotted line in Fig. 2. The oil to be acted upon is then introduced into the filter through the pipe 4 under the cone 6. Whatever water there may be mixed with the oil thus introduced mingles at once with the water in the filter. The oil rises and passes through the wire-gauze, 8, which frees it from the coarser particles of dirt which it may contain. After this process it comes in contact with the finer gauze, 11, which causes a still further separation of the impurities.

The cone-shaped plates answer two purposes. First, they collect the oil upon the inside as it rises and cause it to pass upward in the center of the filter, thus keeping the sides or walls of the filter free from oil. They also collect the dirt which is precipitated from the liquid and cause it to pass to the bottom outside of the current of inflowing oil and prevent it from again mixing therewith. After leaving the cone 9, the oil encounters the filter-box 12 (when the use of this appliance is required) and is collected in the cup-shaped recess at the bottom of this box and gradually passed through the filtering medium which it contains. After this process it is carried successively through the filter-cloths 14 and finally deposited upon the surface of the liquid. All of the filter mediums are placed beneath the surface of the liquid, and the oil is separated in the liquid into small particles as it passes through the mediums. The filtration is therefore much more rapid and perfect than it would be if the filtering mediums were not submerged, and I consider it an essential feature of my invention that the filtering mediums be placed beneath the surface of the liquid.

It is also preferable in many instances to arrange the filtering mediums so that there is a space between their edges and the wall of the filter-casing, as thereby the water or other liquid may pass freely above or below the medium without passing through it. This is especially desirable, as a surplus of water will sometimes get above the filter medium and cannot pass back, owing to the coating of oil on the under side of the medium when a filter-box, as 12, is used. This box, when filled with wool or other filtering medium, will retain a large amount of oil, through which the water will not pass except it be under considerable pressure. It would therefore be necessary if the medium extended entirely across the case to draw off from the top any water that might be forced through to the upper side of the medium.

It will be seen that in the ordinary mode of filtering the heavier particles contained in the oil will fall to the bottom and soon form a coating over the filtering medium, which obstructs or entirely prevents the passage of the oil, whereas in my improvement by passing the oil upward through the filter the heavier particles remain at the bottom and only the lighter particles come in contact with the filtering medium. The force exerted upon the oil by the liquid to pass it through the filter under these circumstances is greater than if actuated by gravity, and consequently more oil can be passed through in a given time, or a smaller filter can be used for the same result. As the oil passes up from the bottom, any sediment which is retained by the gauze or filter-cloths will be upon the under side, and after the oil has entirely passed this sediment will fall from the filtering mediums by its own weight, or it will be carried off by the liquid, and the said filtering mediums will be less liable to become clogged or choked; and I also find that in passing the oil through the submerged filtering mediums many impurities are taken up by or combined with the liquid which would otherwise be held by the oil and be a detriment thereto. If it should be deemed necessary, steam may be introduced with the oil as it enters the filter to hasten the operation.

I do not claim in this application the described process of filtering oil, having claimed the same in a separate application filed May 18, 1888, Serial No. 274,320.

I claim as my invention—

1. The combination, in an oil-filter, of a filter-casing containing a liquid with which the oil will not mix and of greater specific gravity than the oil to be cleansed, and a filtering medium arranged in said casing beneath the surface of the liquid, with a space between said medium and the wall of the casing, substantially as described, and for the purpose set forth.

2. The combination, with the oil-filter having the submerged filter mediums and the inlet-pipe below said mediums, of the exit-pipe 18 below said mediums, and the inverted-U-shaped pipe 17, having both of its branches connected with said exit-pipe, and a stop-cock, 19, all substantially as described.

3. The combination, with the casing having the inlet-pipe, of the cone-shaped plates 6 and 9, having openings 7 and 10, and wire-gauze screens 8 and 11, supported in said casing above said inlet-pipe, substantially as described.

4. The combination, in an oil-filter, of a filter-casing containing a volume of liquid of greater specific gravity than the oil to be cleansed, an inlet-pipe in the lower part thereof, and a filter-box, 12, having its walls extending below the lower surface of its filtering material and arranged beneath the surface of said liquid, with a space between its edges and the wall of the casing, substantially as described.

5. The combination, in an oil-filter, of a filter-casing containing a volume of liquid of greater specific gravity than the oil to be cleansed, a filter-box, 12, arranged beneath said liquid and extending across the casing, with a space between its edges and the walls of the casing, a cone shaped plate, 9, having an opening, 10, beneath said filter-box, and an inlet-pipe beneath said plate, as and for the purpose set forth.

CHARLES F. BAKER.

Witnesses:
A. C. PAUL,
R. H. SANFORD.